(12) United States Patent
Loving

(10) Patent No.: US 7,659,819 B2
(45) Date of Patent: Feb. 9, 2010

(54) RFID READER OPERATING SYSTEM AND ASSOCIATED ARCHITECTURE

(75) Inventor: Sean T. Loving, Lafayette, CO (US)

(73) Assignee: SkyeTek, Inc., Westminster, CO (US)

(*) Notice: Subject to any disclaimer, the term of this patent is extended or adjusted under 35 U.S.C. 154(b) by 645 days.

(21) Appl. No.: 11/387,421

(22) Filed: Mar. 23, 2006

(65) Prior Publication Data

US 2007/0207792 A1 Sep. 6, 2007

Related U.S. Application Data

(60) Provisional application No. 60/673,692, filed on Apr. 21, 2005, provisional application No. 60/712,957, filed on Aug. 31, 2005.

(51) Int. Cl.
*G08B 13/14* (2006.01)

(52) U.S. Cl. ............... 340/572.1; 340/506; 340/539.1; 340/539.11; 340/825.36; 340/825.49

(58) Field of Classification Search .............. 340/572.1, 340/506, 539.1, 539.13, 825.36, 825.49
See application file for complete search history.

(56) References Cited

U.S. PATENT DOCUMENTS

| | | | |
|---|---|---|---|
| 3,842,350 A | 10/1974 | Gross | |
| 4,093,919 A | 6/1978 | Watanabe | |
| 4,924,210 A | 5/1990 | Matsui et al. | |
| 5,013,898 A | 5/1991 | Glasspool | |
| 5,455,575 A | 10/1995 | Schuermann | |
| 5,519,381 A | 5/1996 | Marsh et al. | |
| 5,649,295 A | 7/1997 | Shober et al. | |
| 5,745,037 A | 4/1998 | Guthrie et al. | |
| 5,751,220 A | 5/1998 | Ghaffari | |
| 5,777,561 A | 7/1998 | Chieu et al. | |
| 5,887,176 A | 3/1999 | Griffith et al. | |
| 5,920,261 A | 7/1999 | Hughes et al. | |
| 5,929,779 A | 7/1999 | MacLellan et al. | |
| 5,952,922 A | 9/1999 | Shober | |
| 6,078,251 A | 6/2000 | Landt et al. | |
| 6,161,724 A | 12/2000 | Blacker et al. | |
| 6,172,609 B1 | 1/2001 | Lu | |
| 6,182,214 B1 | 1/2001 | Hardjono | |
| 6,192,222 B1 | 2/2001 | Greeff et al. | |

(Continued)

FOREIGN PATENT DOCUMENTS

| | | |
|---|---|---|
| DE | 298 14 988 | 10/1998 |
| EP | 1772812 A2 | 4/2007 |
| JP | 2002288598 | 10/2002 |
| WO | WO/01/82213 | 11/2001 |
| WO | WO2004/047000 | 6/2004 |
| WO | WO2006123316 | 11/2006 |
| WO | WO/2007/094868 | 8/2007 |

OTHER PUBLICATIONS

PCT/US06/015092 International Search Report & Written Opinion mailed Aug. 23, 2007.

(Continued)

*Primary Examiner*—Daryl Pope
(74) *Attorney, Agent, or Firm*—Lathrop & Gage LLP

(57) ABSTRACT

A framework structure for controlling an RFID device including a platform comprising an RFID radio. The structure comprises a layered framework including a first layer, with at least one functional module comprising a device driver, communicatively coupled with the platform; and a second layer, with at least one functional module comprising an API, communicatively coupled with the first layer and with an application for controlling the RFID device.

32 Claims, 11 Drawing Sheets

U.S. PATENT DOCUMENTS

| | | | |
|---|---|---|---|
| 6,225,901 B1 * | 5/2001 | Kail, IV | 340/539.11 |
| 6,259,367 B1 | 7/2001 | Klein | |
| 6,304,613 B1 | 10/2001 | Koller et al. | |
| 6,317,027 B1 | 11/2001 | Watkins | |
| 6,377,176 B1 | 4/2002 | Lee | |
| 6,420,961 B1 | 7/2002 | Bates et al. | |
| 6,483,427 B1 | 11/2002 | Werb | |
| 6,496,806 B1 | 12/2002 | Horwitz et al. | |
| 6,509,828 B2 | 1/2003 | Bolavage et al. | |
| 6,526,264 B2 | 2/2003 | Sugar et al. | |
| 6,531,957 B1 | 3/2003 | Nysen | |
| 6,539,422 B1 | 3/2003 | Hunt | |
| 6,617,962 B1 | 9/2003 | Horwitz et al. | |
| 6,677,852 B1 | 1/2004 | Landt | |
| 6,717,516 B2 | 4/2004 | Bridgelall | |
| 6,810,122 B1 | 10/2004 | Miyazaki et al. | |
| 6,903,656 B1 | 6/2005 | Lee | |
| 6,985,931 B2 | 1/2006 | Dowling | |
| 6,992,567 B2 | 1/2006 | Cole et al. | |
| 7,026,935 B2 | 4/2006 | Diorio et al. | |
| 7,075,412 B1 | 7/2006 | Reynolds et al. | |
| 7,103,911 B2 | 9/2006 | Spies et al. | |
| 7,197,279 B2 | 3/2007 | Bellantoni | |
| 7,367,020 B2 | 4/2008 | Bickle et al. | |
| 7,375,616 B2 | 5/2008 | Rowse et al. | |
| 7,378,967 B2 | 5/2008 | Sullivan | |
| 2002/0036569 A1 | 3/2002 | Martin | |
| 2002/0131595 A1 | 9/2002 | Ueda et al. | |
| 2003/0007473 A1 | 1/2003 | Strong et al. | |
| 2003/0055667 A1 | 3/2003 | Sgambaro et al. | |
| 2003/0081785 A1 | 5/2003 | Boneh et al. | |
| 2003/0173403 A1 | 9/2003 | Vogler | |
| 2003/0214389 A1 | 11/2003 | Arneson et al. | |
| 2003/0216969 A1 | 11/2003 | Bauer et al. | |
| 2004/0069852 A1 | 4/2004 | Seppinen et al. | |
| 2004/0087273 A1 | 5/2004 | Perttila et al. | |
| 2004/0089707 A1 | 5/2004 | Cortina et al. | |
| 2004/0118916 A1 | 6/2004 | He | |
| 2004/0176032 A1 | 9/2004 | Kotola et al. | |
| 2004/0179684 A1 | 9/2004 | Appenzeller et al. | |
| 2004/0212493 A1 | 10/2004 | Stilp | |
| 2004/0232220 A1 | 11/2004 | Beenau et al. | |
| 2005/0036620 A1 | 2/2005 | Casden et al. | |
| 2005/0063004 A1 | 3/2005 | Silverbrook | |
| 2005/0083180 A1 | 4/2005 | Horwitz et al. | |
| 2005/0084100 A1 | 4/2005 | Spies et al. | |
| 2005/0088299 A1 | 4/2005 | Bandy et al. | |
| 2005/0105600 A1 | 5/2005 | Culum et al. | |
| 2005/0116813 A1 | 6/2005 | Raskar | |
| 2006/0006986 A1 | 1/2006 | Gravelle et al. | |
| 2006/0022815 A1 | 2/2006 | Fischer et al. | |
| 2006/0038659 A1 | 2/2006 | Takano et al. | |
| 2006/0074896 A1 | 4/2006 | Thomas et al. | |
| 2006/0208853 A1 | 9/2006 | Kung et al. | |
| 2006/0238305 A1 | 10/2006 | Loving et al. | |
| 2007/0001813 A1 | 1/2007 | Maguire et al. | |
| 2007/0008132 A1 | 1/2007 | Bellantoni | |
| 2007/0024424 A1 | 2/2007 | Powell | |
| 2007/0205871 A1 | 9/2007 | Posamentier | |
| 2008/0143482 A1 | 6/2008 | Shoarinejad et al. | |
| 2008/0143485 A1 | 6/2008 | Frerking | |

OTHER PUBLICATIONS

PCT/US06/015092 International Preliminary Report on Patentability; Oct. 23, 2007.
PCT/US06/015093 International Search Report & Written Opinion mailed Feb. 22, 2007.
PCT/US06/015093 International Preliminary Report on Patentability; Oct. 23, 2007.
PCT/US06/015342 International Search Report & Written Opinion mailed Jul. 6, 2007.
PCT/US06/015342; International Preliminary Report on Patentability; Oct. 24, 2007.
PCT/US06/015343 International Search Report & Written Opinion mailed Nov. 13, 2006.
PCT/US06/015343; International Preliminary Report on Patentability; Oct. 24, 2007.
PCT/US06/015344 International Search Report & Written Opinion mailed Oct. 4, 2006.
PCT/US06/015344 International Preliminary Report on Patentability; Oct. 24, 2007.
PCT/US06/015347 International Search Report & Written Opinion mailed Sep. 28, 2006.
PCT/US06/015347 International Preliminary Report on Patentability; Oct. 24, 2007.
PCT/US06/027164 International Search Report & Written Opinion mailed Oct. 26, 2007.
PCT/US06/027164 International Preliminary Report on Patentability; Mar. 4, 2008.
PCT/US06/034023 International Search Report & Written Opinion mailed Aug. 10, 2007.
PCT/US06/034023 International Preliminary Report on Patentability; Mar. 4, 2008.
PCT/US06/26933 International Search Report & Written Opinion mailed Dec. 20, 2007.
Gagne, Martin, "Identity-Based Encryption: a Survey," Cryptobytes—the Technical Newsletter of RSA Laboratories, Spring 2003.
Gemmell, Peter, "An Introduction to Threshold Cryptography," Cryptobytes—the Technical Newsletter of RSA Laboratories, Winter 1997.
Shamir, Adi, "How to Share a Secret," Communications of the ACM, vol. 22 Issue 11 (Nov. 1979).
Shamir, Adi, "Identity-Based Cryptosystems and Signature Schemes," Proceedings of Crypto '84, pp. 47-53.
Schneier, Bruce, Applied Cryptography, 2nd Edition, Wiley and Sons, 1996, pp. 71-73 and 528-531.
Microsoft Corporation, "Description of the Secure Sockets Layer (SSL) Handshake," Article ID: 257591, Jun. 23, 2005.
U.S. Appl. No. 11/301,770; Office Action mailed Jun. 6, 2008; 10 pages.
U.S. Appl. No. 11/409,463; Office Action mailed Jun. 27, 2008; 5 pages.
U.S. Appl. No. 11/301,423; Office Action mailed Jun. 26, 2008; 12 pages.
U.S. Appl. No. 11/323,214; Office Action mailed Jun. 27, 2008; 13 pages.
U.S. Appl. No. 11/408,652; Restriction Requirement mailed Apr. 28, 2008; 11 pages.
U.S. Appl. No. 11/408,652; Response to Restriction Requirement filed May 28, 2008; 8 pages.
U.S. Appl. No. 11/301,396; Office Action mailed Jun. 26, 2008; 9 pages.
U.S. Appl. No. 11/387,422; Office Action mailed Jun. 16, 2008; 8 pages.
PCT/US06/015094 International Search Report & Written Opinion mailed Sep. 22, 2008, 10 pages.
U.S. Appl. No. 11/513,667 Notice of Allowance and Interview Summary mailed Sep. 9, 2008, 9 pages.
U.S. Appl. No. 11/408,652, Office Action mailed Oct. 1, 2008, 9 pages.
U.S. Appl. No. 11/328,209, Office Action mailed Dec. 19, 2008.
U.S. Appl. No. 11/301,770, Response to Office Action filed Sep. 5, 2008, 3 pages.
U.S. Appl. No. 11/301,770 Office Action mailed Dec. 10, 2008, 10 pages.
U.S. Appl. No. 11/301,587, Response to Office Action filed Dec. 16, 2008, 10 pages.
U.S. Appl. No. 11/301,587, Office Action Mailed Sep. 16, 2008, 11 pages.
U.S. Appl. No. 11/301,423, Response to Office Action filed Sep. 26, 2008, 4 pages.

U.S. Appl. No. 11/301,396, Response to Office Action filed Sep. 26, 2008, 5 pages.
U.S. Appl. No. 11/301,396 Office Action mailed Jan. 23, 2009; 10 pages.
U.S. Appl. No. 11/323,214, Response to Office Action filed Dec. 29, 2008, 23 pages.
U.S. Appl. No. 11/301,423, Office Action mailed Dec. 30, 2008, 15 pages.
U.S. Appl. No. 11/323,214, Notice of Allowance mailed Apr. 30, 2009, 6 pages.
U.S. Appl. No. 11/301,587, Office Action Mailed Mar. 3, 2009; 10 pages.
U.S. Appl. No. 11/301,587, Response to Office Action filed Jun. 3, 2009; 6 pages.
U.S. Appl. No. 11/306,980, Office Action mailed Apr. 17, 2009, 19 pages.
European Application No. 08006103 Search Report Aug. 7, 2008, 5 pages.
European Application No. 08011298 Search Report, Sep. 19, 2008, 6 pages.
European Application No. 08006104 Search Report, Nov. 28, 2008, 4 pages.
European Application No. 08011299 European Search Report, Jan. 14, 2009, 8 pages.
PCT/US06/14973 International Search Report, Apr. 9, 2008, 1 page.
PCT/US06/14973 International Preliminary Report on Patentability, Mar. 31, 2009, 4 pages.
PCT/US06/26933 International Search Report, Dec. 20, 2007, 1 page.
PCT/US06/26933 International Preliminary Report on Patentability, Mar. 17, 2009, 6 pages.
PCT/US06/15346 International Search Report, Jul. 7, 2008, 1 page.
PCT/US06/15346 International Preliminary Report on Patentability, Mar. 10, 2009, 6 pages.
PCT/US06/29586 International Search Report, Jul. 21, 2008, 1 page.
PCT/US06/29586 International Preliminary Report on Patentability, Mar. 17, 2009, 6 pages.
Gao, X et al., An Approach To Security And Privacy of RFID System for Supply Chain, Proc of the IEEE Int'l Conference on E-Commerce Technology for Dynamic E-Business (CEC-East '04) pp. 1-5, Aug. 2004.
Wisegeek, "What is SSL (Secure Sockets Layer)?" Dec. 12, 2004 as verified by the Internet archive, http://web.archive.org/web/20041212172032/http://wisegeek.com/what-is-ssl.htm, 2 pages.
Rieback, M.R., et al. "Is your cat infected with a computer virus?", Proc 4th Annual IEEE Int'l Conference (PERCOM '06) Mar. 13, 2006, pp. 169-179.
European Application No. EP 06751146, Search Report, Dec. 16, 2008, 11 pages.

* cited by examiner

RFID READER OPERATING SYSTEM AND ASSOCIATED ARCHITECTURE

RELATED APPLICATIONS

This application claims benefit of priority to U.S. Provisional Application No. 60/673,692, filed Apr. 21, 2005, which is incorporated herein by reference. This application also claims benefit of priority to U.S. Provisional Application No. 60/712,957, filed 31 Aug. 2005.

BACKGROUND

RFID stands for Radio-Frequency IDentification. An RFID transponder, or 'tag', serves a similar purpose as a bar code or a magnetic strip on the back of a credit card; it provides an identifier for a particular object, although, unlike a barcode or magnetic strip, some tags support being written to. An RFID system carries data in these tags, and retrieves data from the tags wirelessly. Data within a tag may provide identification for an item in manufacture, goods in transit, a location, the identity of a vehicle, an animal, or an individual. By including additional data, the ability is provided for supporting applications through item-specific information or instructions available on reading the tag.

A basic RFID system includes a reader or 'interrogator' and a transponder (RF tag) electronically programmed with unique identifying information. Both the transceiver and transponder have antennas, which respectively emit and receive radio signals to activate the tag, read data from the tag, and write data to it. An antenna is a feature that is present in both readers and tags, and is essential for the communication between the two. An RFID system requires, in addition to tags, a mechanism for reading or interrogating the tags and usually requires some means of communicating RFID data to a host device, e.g., a computer or information management system. Often the antenna is packaged with the transceiver and decoder to become a reader (an 'interrogator'), which can be configured either as a handheld or a fixed-mount device. The reader emits radio waves in ranges of anywhere from one inch to 100 feet or more, depending upon its power output and the radio frequency used. When an RFID tag passes through the electromagnetic zone (its 'field') created by the reader, it detects the reader's activation signal. The reader decodes the data encoded in the tag's integrated circuit and the data is often passed to a device (e.g., a computer) for processing.

Two methods distinguish and categorize RFID systems, one based upon close proximity electromagnetic or inductive coupling, and one based upon propagating electromagnetic waves. Coupling is via 'antenna' structures forming an integral feature in both tags and readers. While the term 'antenna' is generally considered more appropriate for propagating systems it is also loosely applied to inductive systems.

Transponders/Tags

The word transponder, derived from TRANSmitter/resPONDER, reveals the function of a tag. A tag responds to a transmitted or communicated request for the data it carries, the communication between the reader and the tag being wireless across the space between the two. The essential components that form an RFID system are one or more tags and a reader or interrogator. The basic components of a transponder are, generally speaking, fabricated as low power integrated circuit suitable for interfacing to an external coil, or utilizing 'coil-on-chip' technology, for data transfer and power generation, where the coil acts as an antenna matched to the frequency supported.

The Reader/Interrogator

Reader/interrogators can differ quite considerably in complexity, depending upon the type of tags being supported and the functions to be fulfilled. However, their overall function is to provide a mechanism for communicating with the tags, providing power to passive tags, and facilitating data transfer. Functions performed by the reader may include signal conditioning, parity error checking and correction. Once the signal from a transponder has been correctly received and decoded, algorithms may be applied to decide whether the signal is a repeat transmission, and may then instruct the transponder to cease transmitting. This is known as a 'Command Response Protocol' and is used to circumvent the problem of reading multiple tags in a short space of time. Using interrogators in this way is sometimes referred to as 'Hands Down Polling'. An alternative, more secure, but slower tag polling technique is called 'Hands Up Polling', which involves the interrogator looking for tags with specific identities, and interrogating them in turn. This technique requires contention management, and a variety of techniques have been developed to improve the process of batch reading, including anti-collision techniques.

Current RFID systems require that a tag be in the field of the reader (interrogator), and powered on, in order for a user to interact with it. Furthermore, current tags are limited to the capabilities inherent in the tag. In multiple tag type environments, an RFID system is typically forced to use the common subset of tag capabilities, and has limited ability to support new or enhanced tags.

Previous embedded software systems have had limitations including the utilization of static software architectures whose specific software implementations are integral with their application-specific program or functionality. These monolithic implementations are often found in microcontroller-based designs wherein the embedded software or firmware has system resources and performance that are limited by the hardware.

Problem to be Solved

Traditional RFID applications have been closed loop and proprietary. Preexisting RFID readers are controlled by dedicated, closed-architecture, monolithic, embedded software (firmware). In previous RFID readers, features and functionality in the readers are set at compile time, and the readers are typically application specific. These readers do not allow a user or programmer to modify or upgrade only those specific aspects of a reader's functionality (i.e., code sections or modules) which the user/programmer would like to change. Rather, in order to modify segments of code in the reader with any reasonable degree of granularity, the entire reader firmware module must typically be re-programmed (e.g., 're-flashed', in the typical case where the reader employs flash memory), or, in the case of multiple-processor readers, a relatively large part of the existing reader firmware must still be extensively re-programmed. Nor do preexisting RFID readers allow modularity or granularity with respect to the security level of specific modules (drivers/applications, etc.), so that, for example, the code in pre-selected proprietary modules may be kept secure (i.e., remain undecipherable to an unauthorized user/programmer), while the code in other specific modules may be readily re-programmed.

As markets such as contactless payment and supply chain management emerge, wide-scale adoption of RFID remains inhibited as the industry continues to deliver reader technology as monolithic hardwired devices with inaccessible RFID radio control software. Thus the benefits of RFID have been difficult to implement across a wider set of applications. For example, access control readers and animal scanners cannot be integrated into cell phones, DVD players or medical devices. Furthermore, because RFID readers have been delivered as vertically-integrated 'black-box' technology, software developers have not had access to the inner workings of the readers.

Even within retail supply chain, RFID reader requirements vary widely from stationary label printers to handheld devices and from forklifts to dock doors. Indeed there remains a problem in the industry that no standard technology can support the spectrum of reader requirements—from power and frequency control, to host interfaces, to tag protocols and standards, as well as the wide variety of price/performance tradeoffs related to read range and rate, physical size, power consumption and cost.

Solution to the Problem

A framework structure is disclosed for controlling an RFID device including a platform comprising an RFID radio. The structure comprises a layered framework including a first layer, with at least one functional module comprising a device driver, communicatively coupled with the platform; and a second layer, with at least one functional module comprising an API, communicatively coupled with the first layer and with an application for controlling the RFID device.

In one embodiment, the framework structure includes a firmware stratum comprising a tiered plurality of the functional modules, with the stratum being integrated with the layered framework such that each tier of the stratum is layered to functionally correspond to one of the layers in the framework.

DETAILED DESCRIPTION

The present RFID operating system ('RFID OS') comprises an open-architecture software architecture for RFID readers. The system provides interoperability between generic RFID readers, system services, and applications. The present architecture allows RFID reader functionality to be independent of RFID reader hardware architecture.

In the present system, RFID services are layered on top of the RFID OS. For example, a service handler may facilitate a contactless payment transaction by invoking a particular application functionality via a tag protocol API (application programming interface), which in turn, calls on or more APIs to perform RF communication with RFID tags.

The present RFID operating system framework includes a layered architecture that can be used with a multiplicity of different RFID reader platforms. The RFID OS framework interfaces with peripheral hardware, and may perform a number of different application functions such as task scheduling, protocol handling, and storage allocation. The framework provides a default software interface between a host processor and an RFID reader when no application program is running on a particular reader.

Figure 1A:
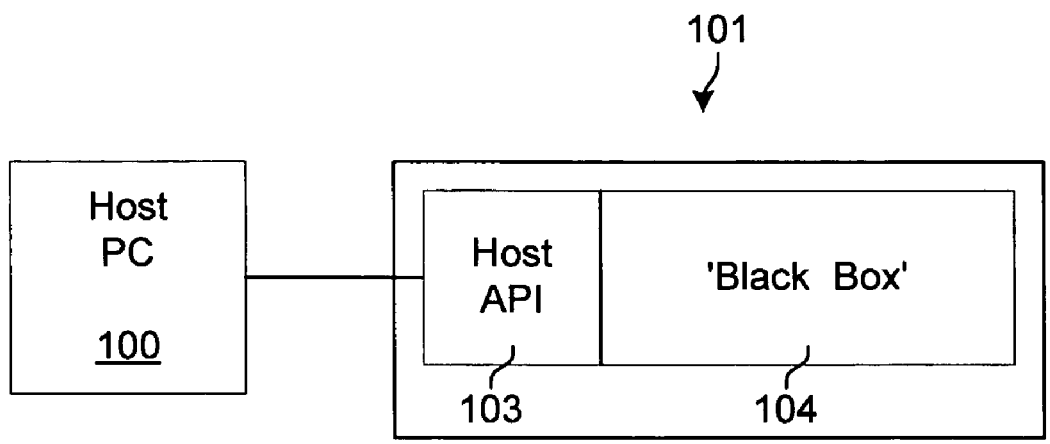
FIG. 1A is a diagram showing a prior art monolithic RFID reader connected to a host computer.
Figure 1B:
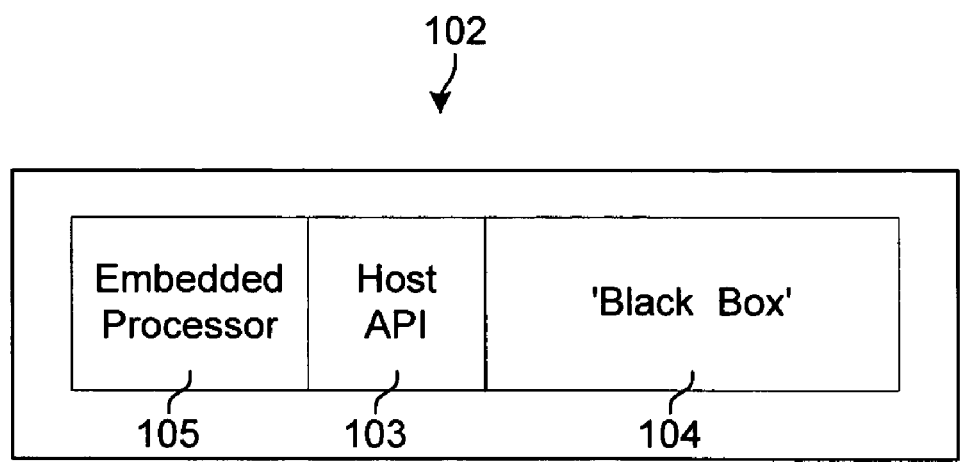
FIG. 1B is a diagram showing a prior art monolithic RFID reader including an embedded processor.

FIG. 1A is a diagram showing a prior art monolithic RFID reader 101 connected to a host computer, and FIG. 1B is a diagram showing a prior art monolithic RFID reader 102 including an embedded processor. In both of the readers shown in FIGS. 1A and 1B, the RFID reader technology consists of monolithic hardwired devices with RFID reader control software/firmware. The term "firmware" is defined as "software that is embedded in a hardware device", and, as used herein, the term implies only the 'software' code in a particular piece of hardware, irrespective of the particular hardware device containing the code.

Reader 101 is connected to an external host computer 100, and reader 102 has an embedded processor 105 which functions as a dedicated, fixed-capability host. In both readers 101/102, a host-specific API 103 is typically integral to the readers, and the reader functionality is pre-established and not modifiable by a user, since the functionality is 'buried' inside user-inaccessible firmware in a 'black box' 104. In the systems of FIGS. 1A and 1B, the reader control features and functionality are set at compile time, thus making the readers 101/102 application-specific. Value-added software & middleware cannot be integrated into these existing readers by a typical user, thereby limiting the readers' performance.

Figure 2:
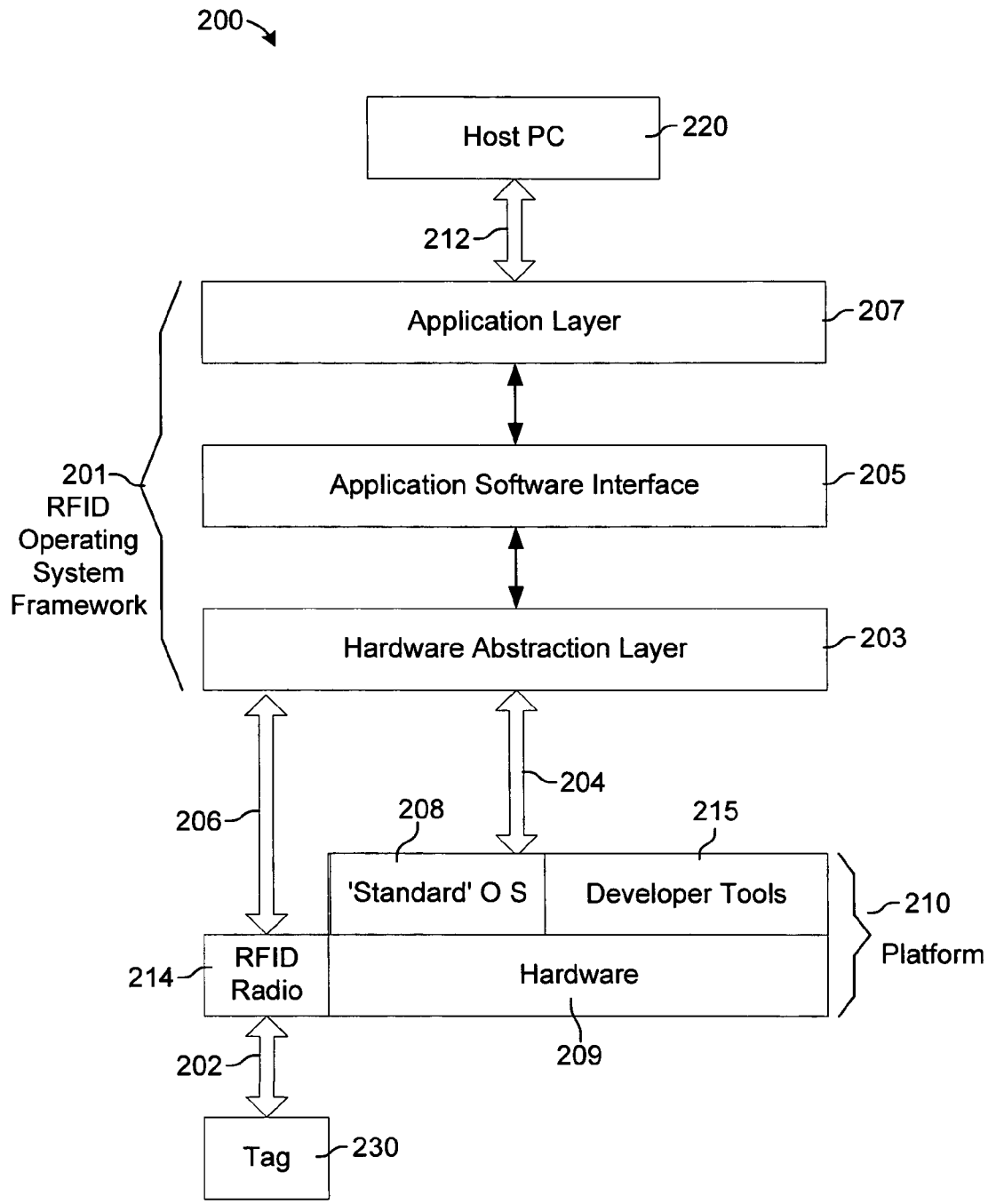
FIG. 2 is a diagram of an exemplary embodiment of the present operating system framework for an RFID Reader, showing high-level architecture of the system.

FIG. 2 is a diagram of an exemplary embodiment 200 of the present operating system environment for an RFID reader, showing high-level aspects of the architecture of the system. As shown in FIG. 2, the present operating system architecture includes a 'vertical' framework 201 coupled between a host computer 220 (via a communications link 212) and an RFID reader platform 210. In the most general sense, platform 210 may be considered as a basic RFID reader/interrogator, minimally including hardware 209 and an RFID 'radio' 214, which may comprise a receiver or a transceiver, depending upon the particular application and type of RFID tag 230 for which the platform 210 is intended. Radio 214, which includes an antenna (not shown), functions to exchange data with RFID tag 230 via RF link 202.

Reader platform 210 comprises on-board control software for an RFID reader that can be customized and built upon by third-party developers. This platform enables OEMs to easily RFID-enable new or existing devices.

Reader platform 210 may also include an embedded operating system 208, such as Linux or Windows CE. Platform 210 may be coupled to framework 201 via an operating system 208 running on the platform (through interface 204), or via RF communication with RFID radio 214, using an RF link 206. In the latter instance, the platform typically does not include operating system 208.

As explained below, the present RFID OS vertical framework 201 is integrated with a horizontal firmware stratum (shown in FIGS. 3B-3C) to support a range of options for use with an RFID reader platform 210. These options include firmware components that can be used independently or in combination, a set of API extensions to embedded operating systems, and a stand-alone operating system for dedicated RFID reader architectures.

As shown in FIG. 2, the vertical framework 201 for the present system comprises three layers, which are effectively situated 'on top of' platform 210:

(1) a hardware abstraction layer 203, including RFID reader hardware drivers and associated APIs;

(2) an RFID reader application software interface layer 205, including RFID reader software Libraries and associated APIs; and (3) an application layer 207, including application software for controlling reader platform 210.

Specific examples of functional modules included in the above layers are described with respect to FIGS. 4A-4C, below.

Figure 3A:
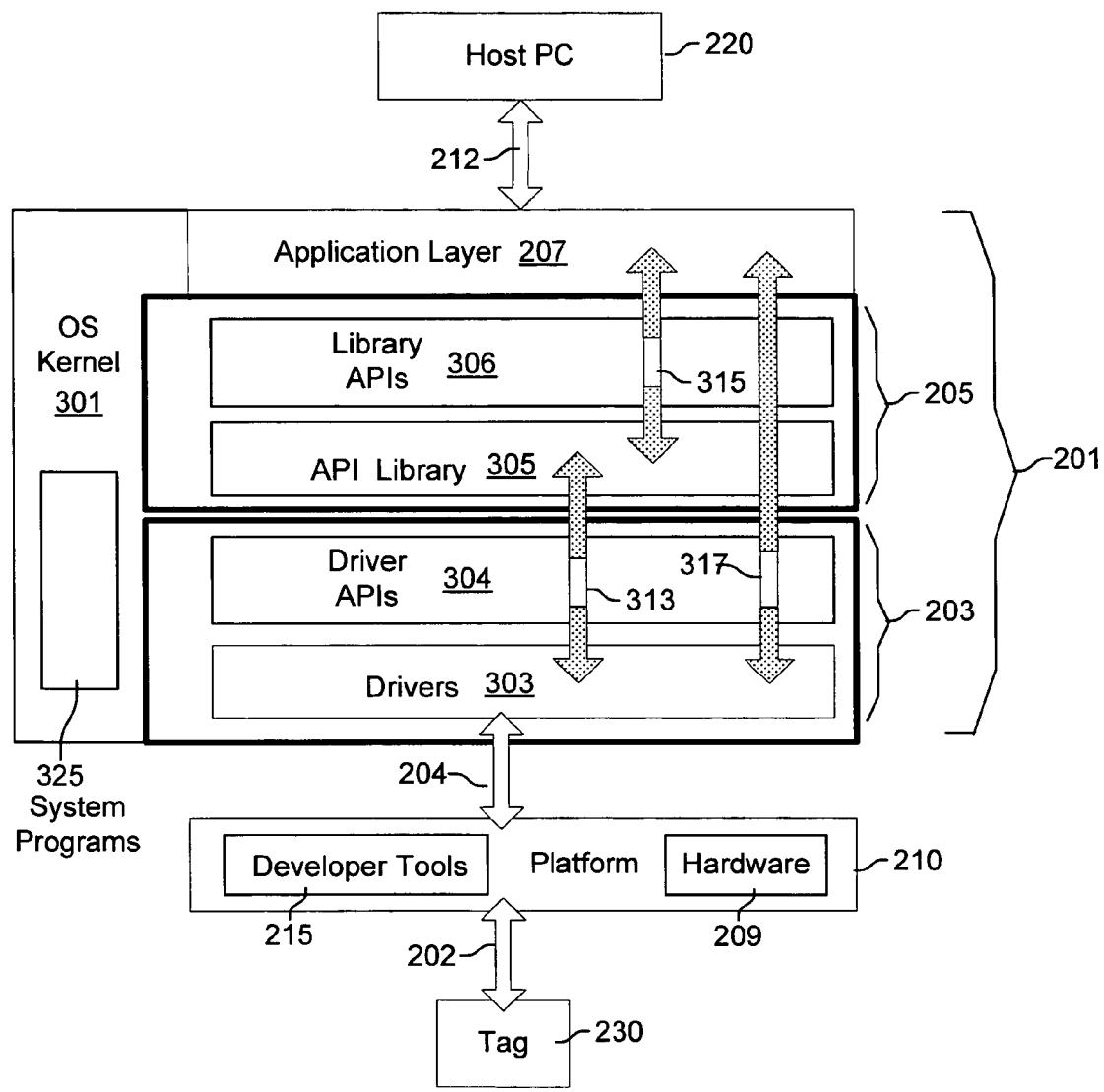
FIG. 3A is a diagram of one embodiment of the present operating system for an RFID Reader showing, more specifically, the layered structure of the system architecture.

FIG. 3A is a diagram of one embodiment of the present operating system for an RFID Reader showing, more specifically, the vertically layered structure of the system architecture. The layered architecture of the present system allows applications and services to access a set of multiple library and driver APIs. As used herein, the term "driver" refers to (a) a program that controls a device, where a 'device' may be considered to be any type of hardware device, or circuit, or (b) another program that performs a function using a predefined protocol or set of instructions. A driver acts like a translator between the device and programs that use the device.

As shown in FIG. 3A, framework 201 vertically tiered with respect to RFID reader application software interface layer 205 and hardware abstraction layer 203, both of which are also tiered or layered in a 'vertical' direction between reader platform 210 and application layer 207.

More specifically, the application software interface layer 205 is tiered or divided into two functional sub-layers, a layer 305 including library functions (or modules), and a layer 306 including APIs for interfacing between the library functions and the application layer 207, as indicated by arrow 315 in FIG. 3A. As used herein, the term "library function" refers to any software or firmware program code, which, although typically stored with other functions in a 'library', may exist in a context (or layer, in the present system) wherein no library is extant. In the present document, the terms "library function" and "library module" are intended to refer to the same type of entity, as a result of the modular nature of the present system architecture.

The hardware abstraction layer 203 is also tiered or divided into two functional sub-layers, a layer 303 including hardware and communication device drivers (modules), and a layer 304 including driver APIs for interfacing between the drivers and corresponding library functions in API library function layer 305, as indicated by arrow 313.

It should be noted that, in certain cases, where an application in layer 207 has a priori knowledge of the protocol or other mechanism for communicating with a particular driver in layer 303, the application may bypass the application software interface layer 205 and directly call the driver, as indicated by arrow 317.

As indicated in FIG. 3A, the RFID OS vertical framework 201 includes an operating system kernel 301 which is always present, and various system programs 325 which use facilities provided by the kernel to perform higher-level 'housekeeping' tasks. Each of the vertical layers in the present system is described in greater detail immediately below.

Platform Layer

The RFID operating system vertical framework 201 may be viewed as resting on top of the reader platform layer 210. In an exemplary embodiment, platform 210 includes hardware, plus an optional operating system 208 and developer tools 215. The terms "hardware platform" or "hardware layer" are often used interchangeably when referring to a platform. A simple platform 210 might use 8-bit microcontroller hardware with no operating system; in this case, modules in RFID OS framework 201 serve as the device operating system. On platforms with more powerful processors, the present system integrates with both the target operating system 208 and the platform hardware 209; in this case, portable RFID OS framework components reside in the different processors, logic blocks and ASICs that comprise a particular platform 210. The open software architecture of the RFID OS framework 201, together with the horizontal layering of the firmware stratum (described below) facilitates integration of RFID radio hardware with most types of processors and OS platforms.

Figure 4A:
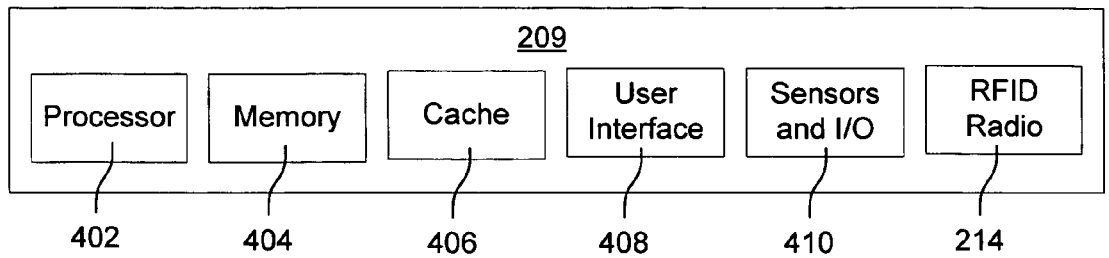
FIG. 4A is a diagram showing exemplary hardware components which may be included in layer 209 of the present system.

FIG. 4A is a diagram showing exemplary hardware components which may be included in platform hardware 209 of the present system. As shown in FIG. 4A, these hardware components may include, for example, processor 402, processor main memory 404, cache memory 406, user interface 408, sensors and associated I/O devices 410, and RFID radio 214.

Hardware Abstraction Layer/Drivers

As shown in FIG. 3A, driver APIs (in sub-layer 304 of hardware abstraction layer 203) function as the software interface for the low-level software drivers that directly control reader hardware 209. In an exemplary embodiment, the driver APIs (in sub-layer 304 of layer 203) are platform-independent. The code that implements each driver is, however, platform-specific. Typically, only a small amount of code in each low-level driver requires modification when porting to a new platform. The hardware abstraction layer 203 in RFID OS framework 201 provides portability for 'on-reader' applications, and platform-independence across RFID-enabled devices.

Figure 4B:
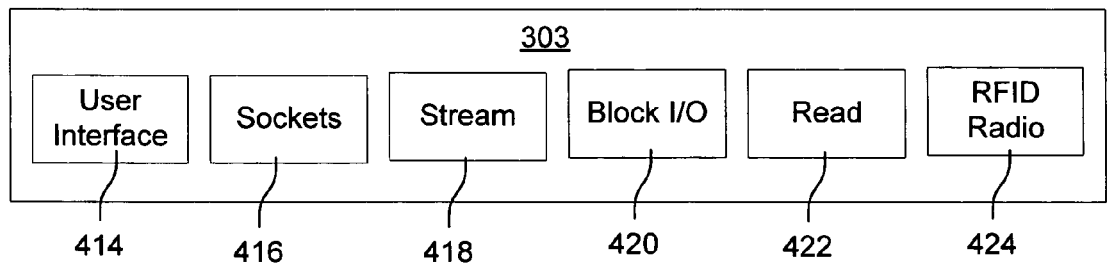
FIG. 4B is a diagram showing exemplary drivers which may be included in layer 305 of the present system.

FIG. 4B is a diagram showing exemplary drivers which may be included in layer 303 of the present system. Examples of drivers include RFID radio control functions, peripheral hardware control functions and host interface hardware control functions. More specifically, as shown in FIG. 4B, these drivers may include, for example, a user interface driver 414, and communications drivers such as those shown in blocks 416-424.

Application Software Interface Layer/Libraries/APIs

As shown in FIG. 3A, sub-layer 305 of application software interface layer 205 includes a library of functions or modules, and sub-layer 306 includes one or more libraries of APIs defining the software interface used by an application to access internal RFID reader functionality, via the functions in sub-layer 305. In an exemplary embodiment, the library APIs 306 are platform-independent, as are the code implementations of the library functions in sub-layer 305. Unless otherwise indicated, the term "code" is used herein to refer to 'object code', which is code produced by a compiler from 'source code', usually in the form of machine language that a computer (e.g., a microprocessor) can execute directly. The present system allows the use of multiple APIs for 'on-device' applications to control device hardware and low-level functionality in a standard manner, regardless of the device-embedded computing platform 210. Such platforms 210 range from DSP architectures to microprocessor cores with an operating system to microcontroller-based devices, sensors and objects, with or without an operating system.

Application Layer

Applications in application layer 207, as well as in host 100/220, may indirectly access any of the lower layers (205, 203, 210) in the system architecture via a set of APIs 304/306. By accessing the RFID reader hardware and platform 210 via the abstraction layers provided by the libraries and drivers, 'on-reader' applications become portable across devices employing the present architecture. This abstraction layering makes third-party-generated RFID reader software and tag protocol libraries independent of the underlying hardware, thus facilitating the integration of embedded computing intelligence into sensors, devices and ordinary objects.

In an alternative embodiment of the present system, hardware abstraction layer 203 may include one or more drivers and no API(s). In this same embodiment, application software interface layer 205 may include only (one or more) APIs and no library functional modules. In this embodiment, an API in layer 305/205 directly calls a corresponding driver in layer 303/203 to control reader hardware 209.

Figure 4C:
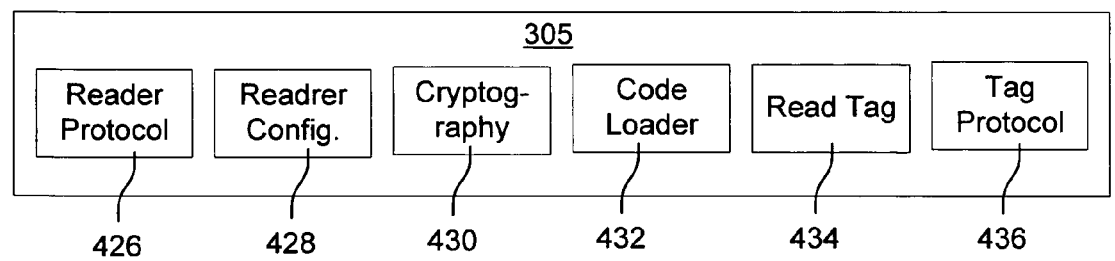
FIG. 4C is a diagram showing exemplary library functions which may be included in layer 207 of the present system.

FIG. 4C is a diagram showing exemplary library functions which may be included in sub-layer 305 of the present system. Examples of library functions include tag functions, security functions and reader configuration functions, such as those shown in blocks 426-436 of FIG. 4C.

Figure 4D:
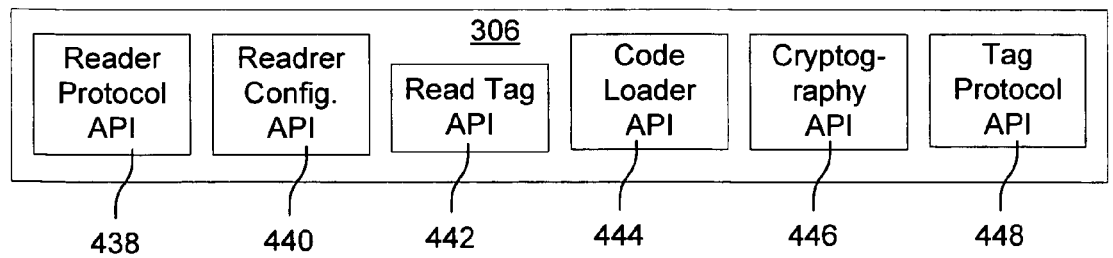
FIG. 4D is a diagram showing exemplary library APIs which may be included in layer 207 of the present system.

FIG. 4D is a diagram showing exemplary library APIs which may be included in sub-layer 306 of layer 205 of the present system. As shown in FIG. 4D, these library APIs generally correspond to counterpart library functions in sub-layer 305.

Application Code Layer

In an exemplary embodiment, as indicated above, on-reader applications make function calls to library functions, which, in turn, call driver functions which control the reader hardware. As shown in FIG. 3A, application layer 207 of the present system includes one or more of these applications.

Figure 3B:
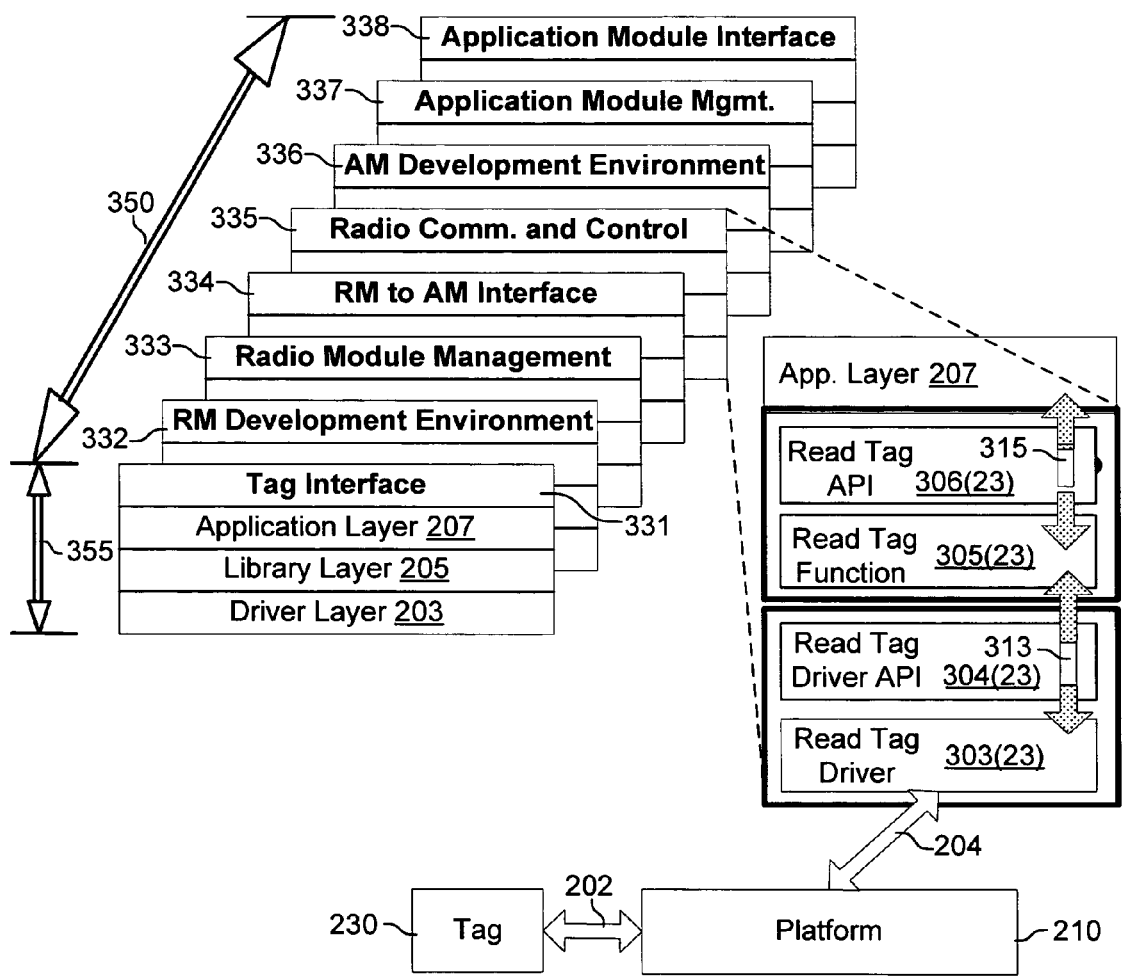
FIG. 3B and FIG. 3C are diagrams of one embodiment of the present operating system for an RFID Reader showing system architecture including the orthogonal relationship between the horizontally layered 'firmware stratum' and the vertically layered abstraction structure of the system architecture.
Figure 3C:
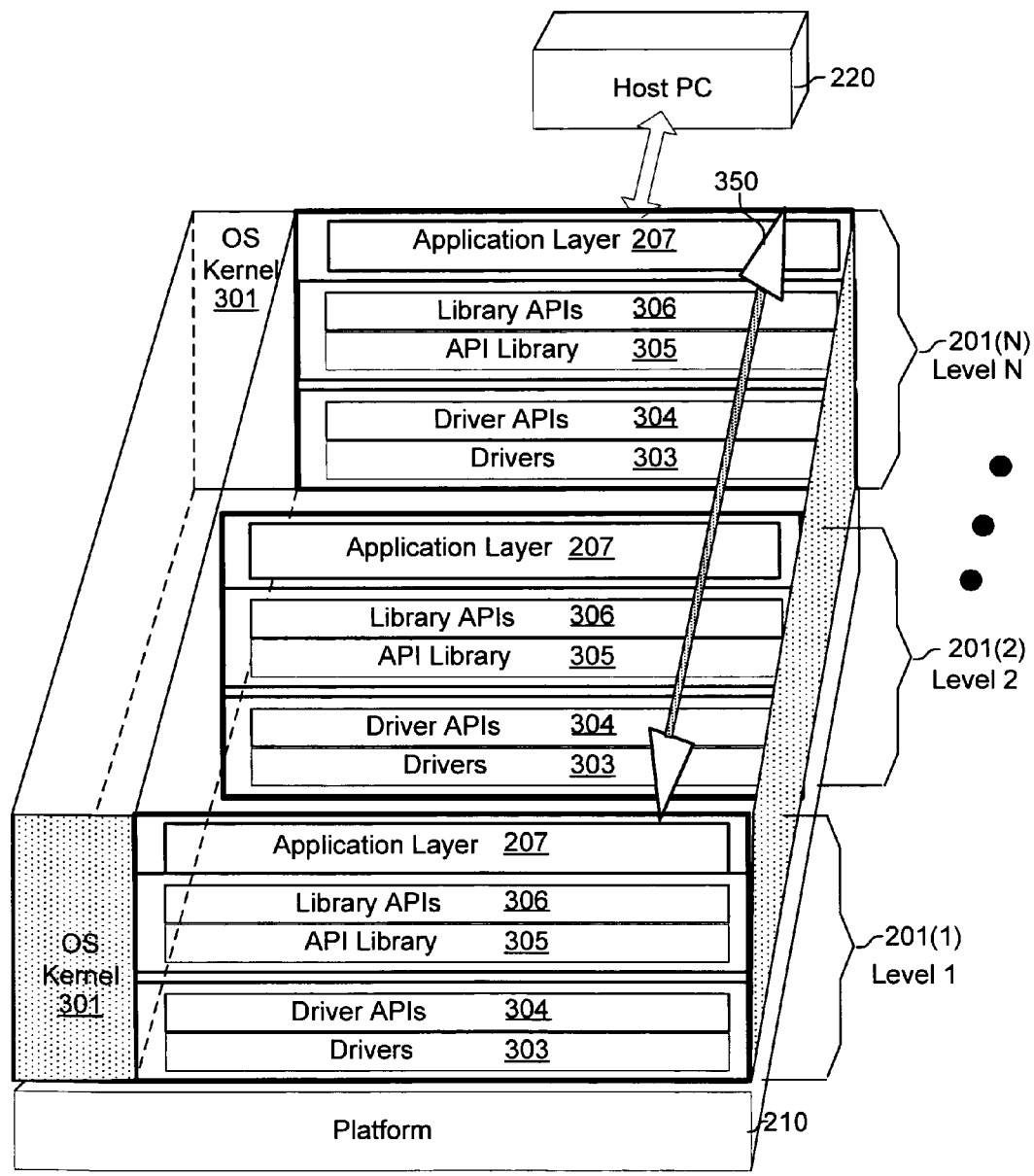

FIG. 3B and FIG. 3C are diagrams of one embodiment of the present RFID reader operating system architecture showing exemplary tiers or levels of functionality provided by 'horizontal' firmware layering in a 'firmware stratum' 350. The architecture of the present system is best understood by viewing FIGS. 3B and 3C in conjunction with one another, wherein the orthogonal relationship between the horizontally layered firmware stratum 350 and the vertically layered abstraction structure 201 (*) [where the asterisk indicates one of a plurality of similar items] of the system architecture is shown. Firmware stratum 350 is a collection of modules, which, when considered as being 'stacked' along a horizontal plane, is positioned orthogonally relative to the vertical layering of framework 201. Each of the layers (tiers) in the firmware stratum is hereinafter termed a "level" 33X (e.g., 331-338) thereof, and each of the levels of the firmware stratum is layered in accordance with the three-tiered scheme 201 shown in FIG. 2 and FIG. 3A. Note that, in the present example shown, firmware stratum levels 331-338 in FIG. 3B correspond to levels 201(1)-201(N) in FIG. 3C.

The orthogonal relationship between firmware stratum 350 and the layering of composite structure 201(*) is indicated in FIG. 3B by the relationship between arrow 350, which shows the 'horizontal' layering of the firmware stratum, and arrow 355, which shows the 'vertical' layering of each of the components or 'levels' of the firmware stratum. Each level 33X of firmware stratum 350 includes one, two, or three modules, the aggregate of which may include an API, a library function (or other functional component), and a driver. Thus, each stratum level 33X is itself layered in the three-tiered scheme of framework structure 201.

Table 1, below, lists specific modules or other functional components that may be included in the firmware stratum 350 in an exemplary embodiment of the present system. In Table 1, each level 33X may be further subdivided into sub-levels, each of which is designated in the Table as being a member of a respective higher level, as indicated in FIGS. 3B and 3C.

TABLE 1

FIRMWARE STRATUM

| FIG. 3 LEVEL | SUBLEVEL | FUNCTION |
| --- | --- | --- |
| 338 | | Application Module Interface |
| | 44 | AM-Host Interface |
| | 43 | AM-Host Protocol Security |
| | 42 | AM-Host Discovery |
| | 41 | AM-Host Plug-and-Play |
| | 39 | AM-Host APIs, Protocols and Adapters |
| | 38 | AM-Host Protocol Transport |
| | 37 | AM-Host Physical Connection |
| 337 | | Application Module Management |
| | 36 | AM Self Test |
| | 35 | AM Code Update |
| | 34 | AM Management |
| | 33 | AM Configuration |
| 336 | | Application Module Development Environment |
| | 32 | AM Connected Devices |
| | 31 | Interpreter Support |
| | 30 | AM Operating System |
| | 29 | AM Processor |
| | 28 | Application Environment |
| | 27 | Workflow/Scripting Engine |
| 335 | | Radio Communication and Control |
| | 26 | Reader to reader Protocol |
| | 25 | Tag Command Set Types |
| | 24 | Tag Command Language Support |
| | 23 | Read Tag |
| 334 | | Radio to Application Module Interface |
| | 22 | RM (Radio Module)-AM Protocol Security |
| | 21 | RM-AM Discovery |
| | 20 | RM-AM Plug-and-Play |
| | 19 | RM-AM APIs |
| | 18 | RM-AM Protocol(s) |
| | 17 | RM-AM Protocol Transport |
| | 16 | RM-AM Physical Connection |

TABLE 1-continued

FIRMWARE STRATUM

| FIG. 3 LEVEL | SUBLEVEL | FUNCTION |
|---|---|---|
| 333 | | Radio Module Management |
| | 15 | RM Self Test |
| | 14 | RM Code Update |
| | 13 | RM Management |
| | 12 | RM Configuration |
| 332 | | Radio Module Development Environment |
| | 11 | RM Task Automation/Scripting |
| | 10 | RM Connected Devices |
| | 9 | RM Operating System |
| | 8 | RM Processor |
| 331 | | Tag Interface |
| | 7 | Anti-Collision/Tag Singulation |
| | 6 | Tag Command Primitives |
| | 5 | Air Protocol Security |
| | 4 | Air Protocols |
| | 3 | Modulation and Encoding Schemes |
| | 2 | Antenna Tuning, Control and Diversity |
| | 1 | Analog Front End (AFE) Abstraction Layer |

Figure 5:
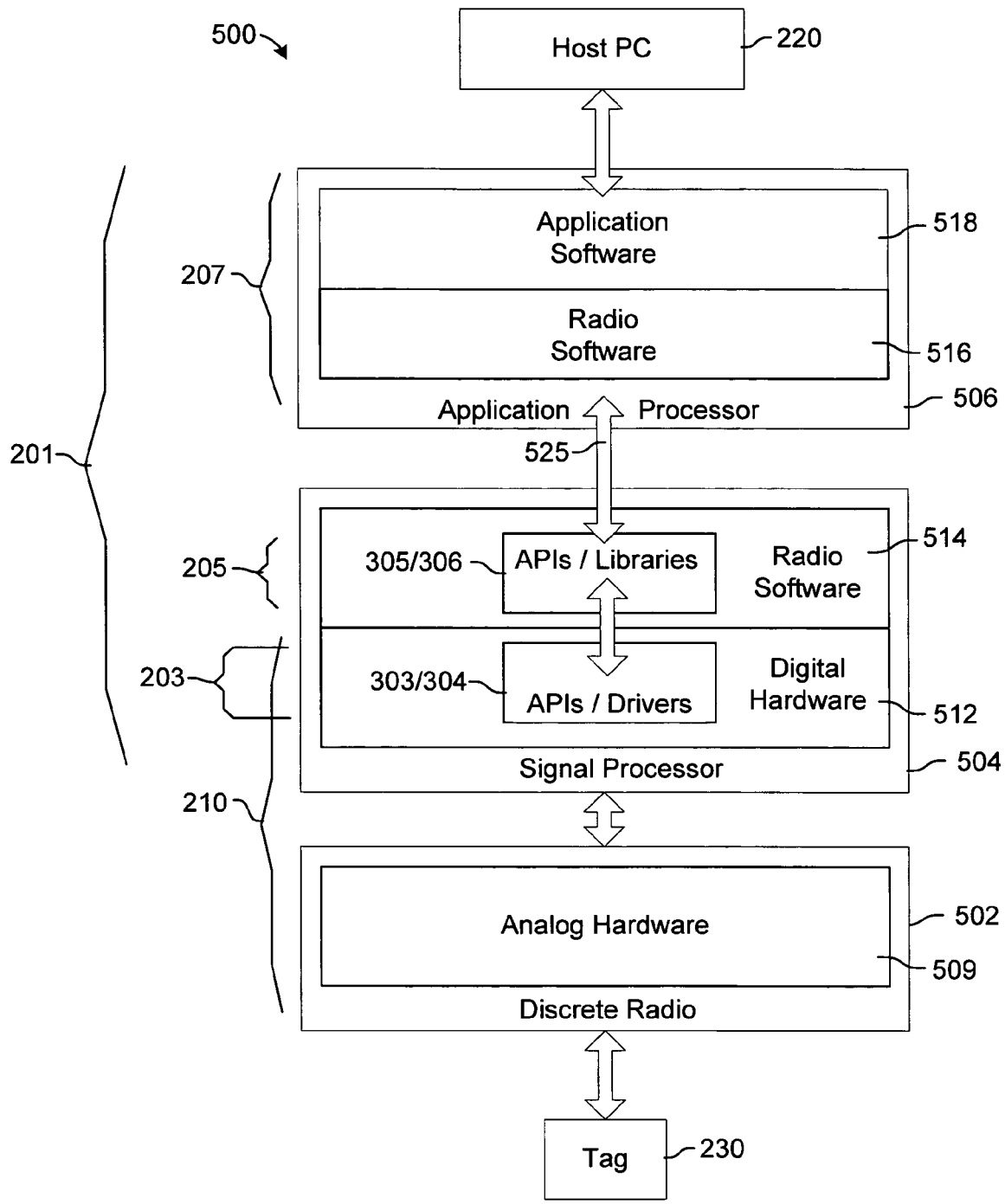
FIG. 5 is a diagram of an exemplary embodiment of the present operating system for an RFID Reader including an application processor, a signal processor, and a discrete radio device.

FIG. 5 is a diagram of an exemplary embodiment of the present operating system architecture 500 for an RFID reader including an application processor 506, a signal processor 504, and a discrete radio device 502. In the system shown in FIG. 5, RFID radio software 514 resides in a signal processor (e.g., block 504), digital state machine or both, and application software 518 and radio-specific software 516 reside in a main application processor 506. Software/firmware modules 516/518 in application processor 506 communicate with radio software 514 and digital hardware 512 in signal processor 504 via APIs, libraries, and drivers 305/306 and 303/304, as described above with respect to the embodiments of FIGS. 2-4.

In the system shown in FIG. 5, the RFID radio hardware comprises separate digital and analog hardware 512, 509, which is respectively split between signal processor 504 and discrete (analog) radio device 502. Accordingly, platform 210 may be considered to overlap with hardware abstraction layer 203, as indicated by respective braces 210 and 203.

Figure 6:
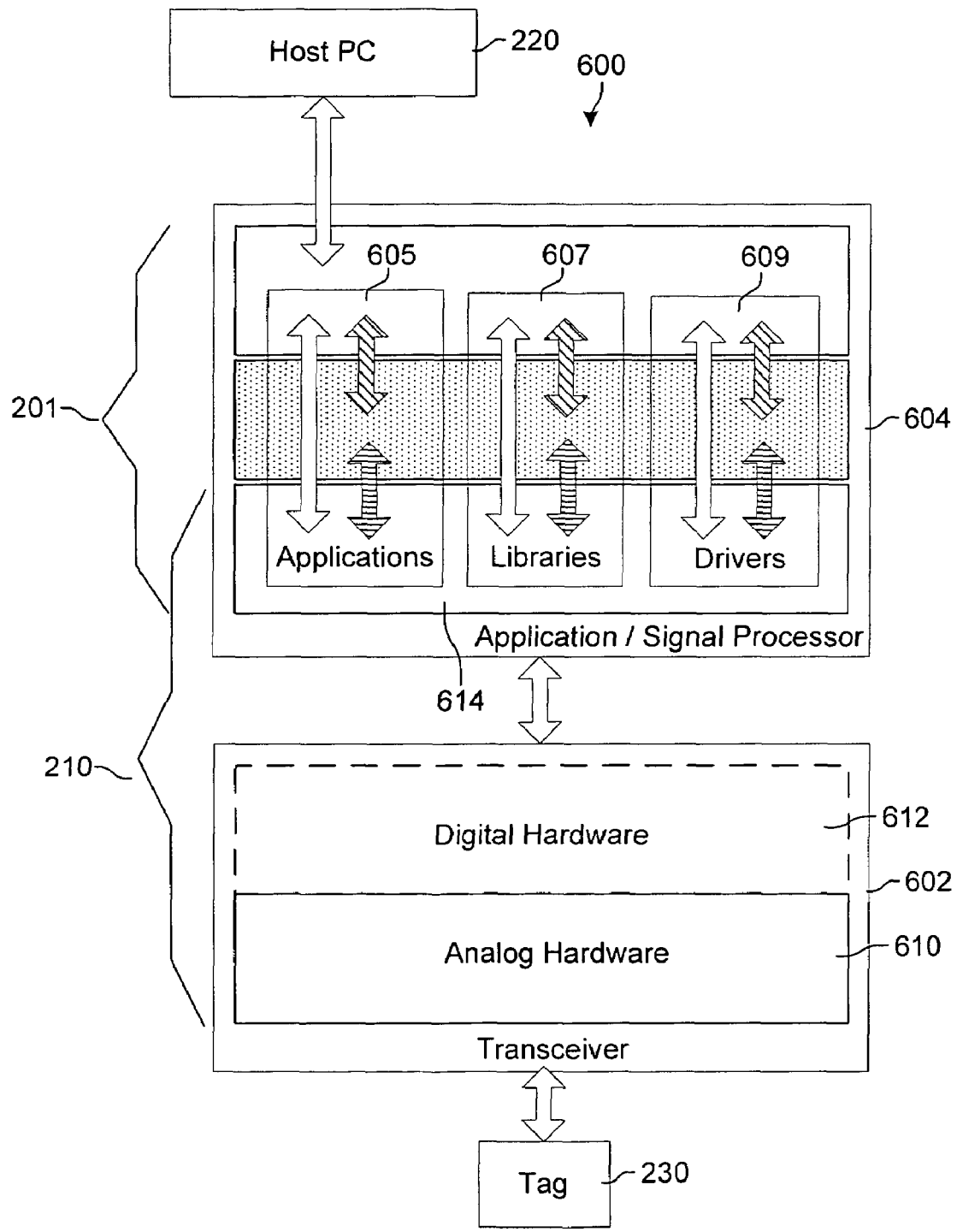
FIG. 6 is a diagram of an exemplary embodiment of the present operating system for an RFID Reader including an integrated application/signal processor and transceiver.

FIG. 6 is a diagram of an exemplary embodiment of the present operating system architecture 600 for an RFID Reader including an integrated application/signal processor 604 and transceiver 602. The system embodiment shown in FIG. 6 is especially suitable for highly embedded RFID applications. In this embodiment, applications 605, libraries 607 and drivers 609, along with associated APIs, reside within a single microcontroller 604 that controls an integrated transceiver 602 (with both analog and digital hardware 610/612) or a discrete analog radio (with analog hardware 610 only). Software/firmware modules and drivers 605/607/609 in integrated signal processor 604 communicate with digital hardware 614 therein, and also with digital hardware 512 in signal processor 504, via APIs, libraries, and drivers 305/306 and 303/304, as described above with respect to the embodiments of FIGS. 2-4.

In the system shown in FIG. 6, the RFID radio hardware comprises separate digital and analog hardware which may be split between signal processor 504 and discrete (analog) radio device 502, as in the system of FIG. 5. Accordingly, platform 210 may be considered to overlap with part of framework 201, as indicated by respective braces 210 and 201.

Figure 7:
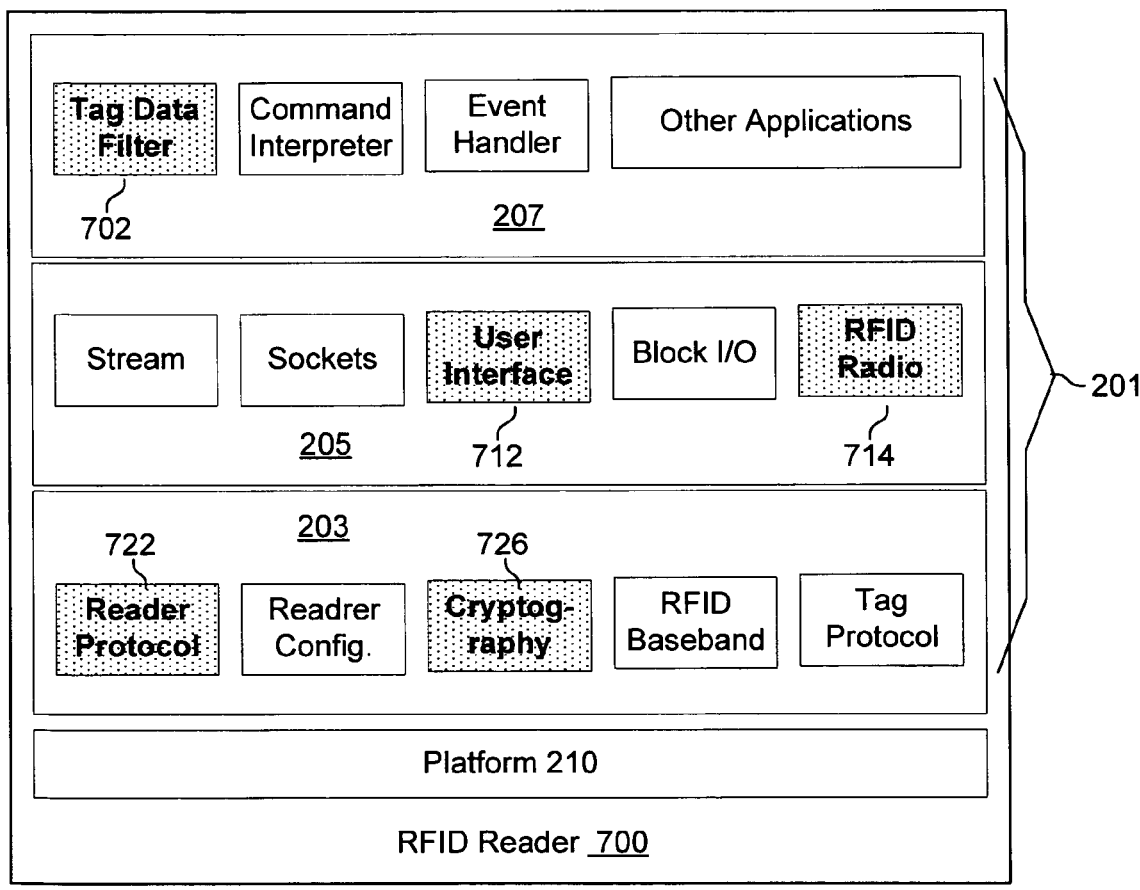
FIG. 7 is a diagram of an exemplary embodiment of the present operating system showing modularity and selectively of security with respect to the firmware components of the system.

FIG. 7 is a diagram of an exemplary embodiment of the present operating system architecture showing modularity and selectively of security with respect to the software and firmware components of a reader 700. In this embodiment, layers 203, 205, and 207 (i.e., all layers of framework 201) have been integrated into an RFID reader.

The software/firmware in reader 700 includes proprietary source code (and other information) security capability, as well as secure delivery capability, so that a user can encapsulate code into a software module that may be distributed in a secure manner (i.e., without being copied). Using a suitable form of encryption as the security mechanism, selected code (in software or firmware form) can reside and operate within the platform or framework without being extracted or copied.

The present system architecture allows any specific software/firmware module to have its API known/published, but any module containing API-related code (the code accessed by the API), for example, may remain protected and secure. Other parties can make function calls to the protected functions by making calls to the functions' published APIs. Each of the components within framework 201 is selectively securable at three levels, i.e., at the driver, libraries, API and/or application level. Some components may be open source, and other components may be locked and proprietary so that third parties can use this open architecture framework as a secure delivery vehicle for their code into the market.

As shown in the example of FIG. 7, module 702 in application layer 207, modules 712 and 714 in hardware abstraction layer 203, and modules 722 and 726 in application software interface layer 205 are encrypted so that they remain inaccessible to unauthorized users and other third parties.

Figure 8:
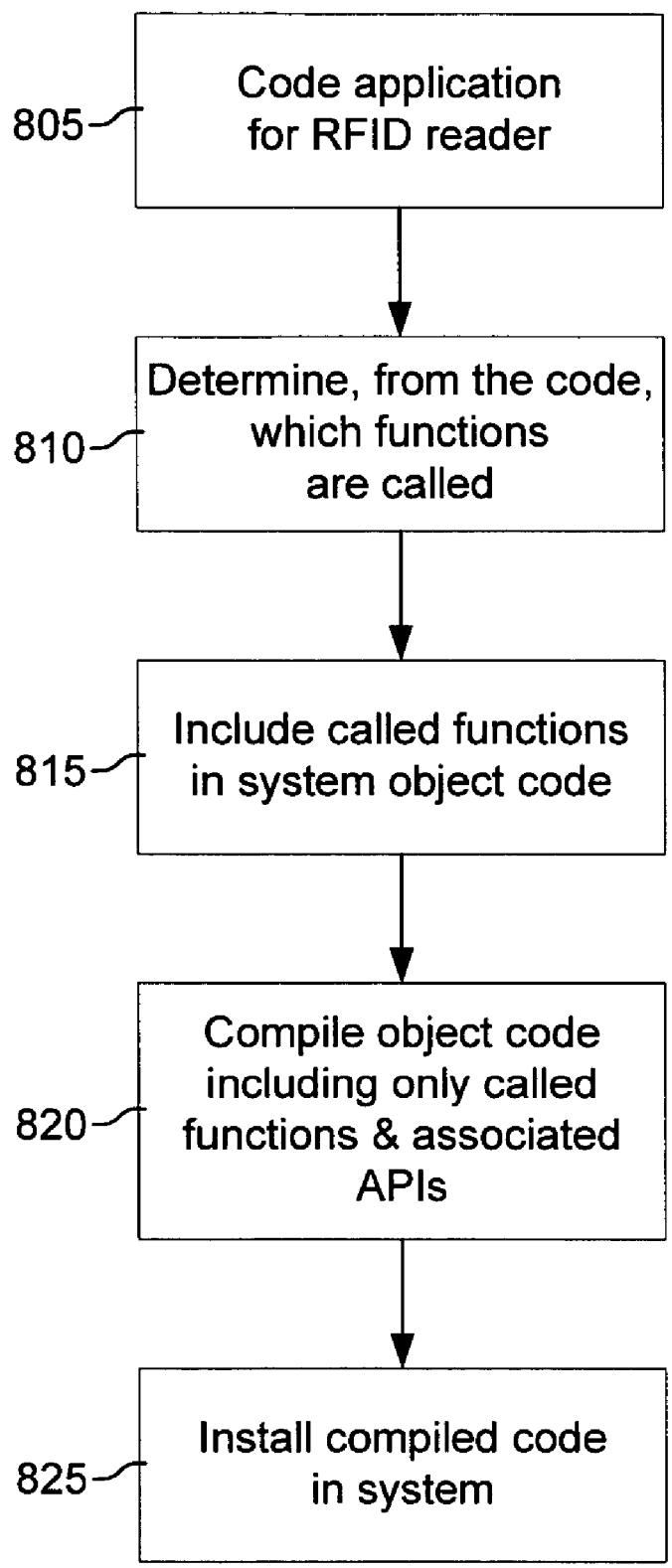
FIG. 8 is a flowchart showing an exemplary set of steps performed in initial setup of one embodiment of the present system.

FIG. 8 is a flowchart showing an exemplary set of steps performed in the initial setup of one embodiment of the present system. As shown in FIG. 8, at step 805, application code for an RFID reader is first written; this establishes the desired new functionality. The application makes function calls to library functions in sub-layer 305 of layer 205 (shown in FIG. 3A) using particular APIs in sub-layer 306 of layer 205. Since each function is a modular software component, the application may selectively call any of the total available functions. Based on which functions are called by the application, at step 810, only those functions which are called are included, at step 815, for compilation into object code, which is performed at step 820. This minimizes the generated object code at compile time, which in turn, provides the ability to determine how much code space is required in a target microprocessor/microcontroller/FPGA, etc, when the code is installed in a particular system (at step 825). If the platform selected is based on a target microcontroller family, then the generated object code size dictates which product in the family provides the minimum resources required to support the application.

Figure 9:
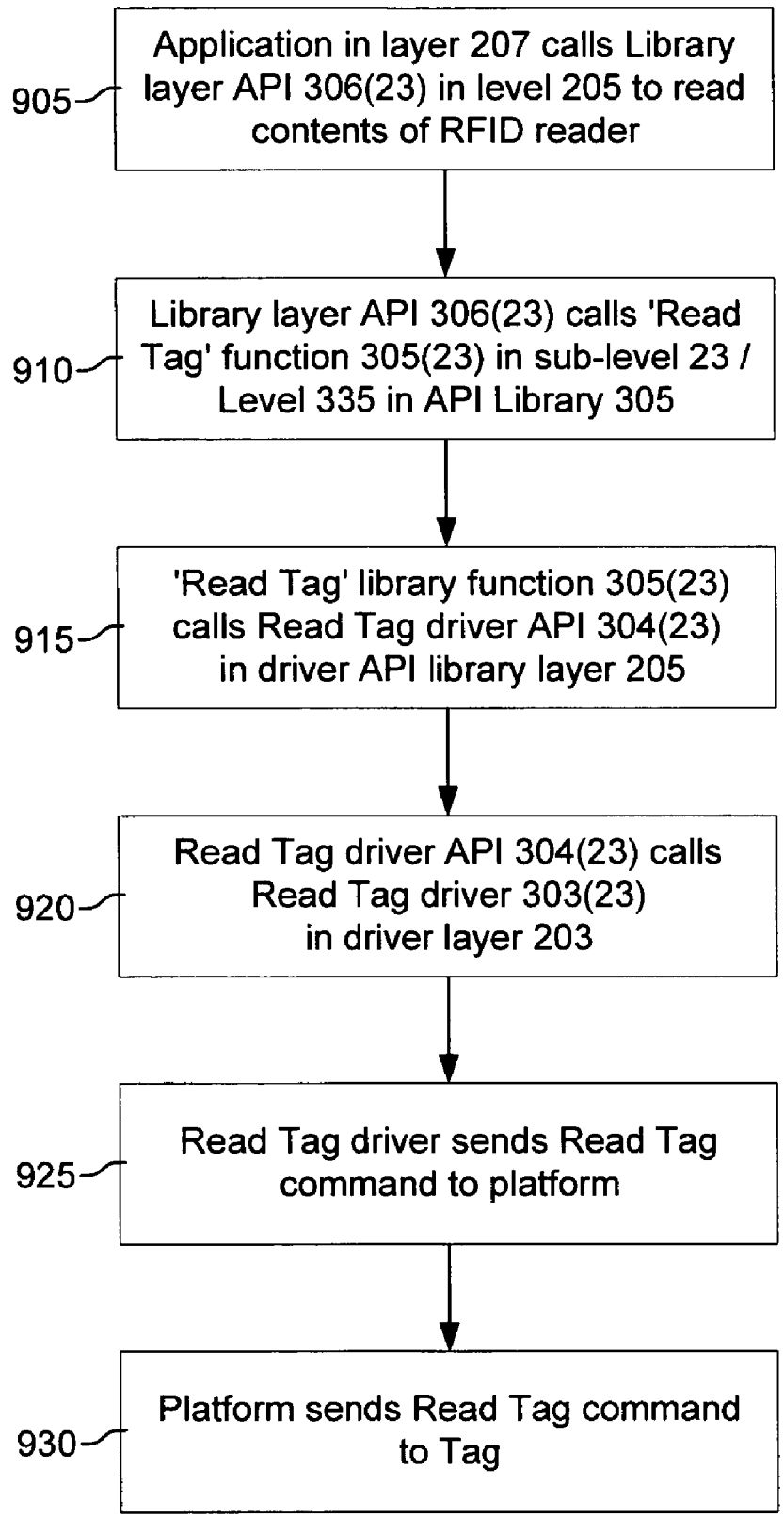
FIG. 9 is a flowchart showing an exemplary set of steps performed in operation of one embodiment of the present system.

FIG. 9 is a flowchart showing an exemplary set of steps performed in operation of one embodiment of the present system. As shown in FIG. 9 (and also with reference to FIG. 3B), at step 905, an application in layer 207 calls Library layer API 306(23) in vertical framework sub-layer 306 of layer 205 to read the contents of an RFID tag 230, for example. At step 910, library layer API 306(23) calls 'Read Tag' function 305 (23) in framework layer 305/firmware stratum Level 335, sub-level 23 in API Library 305. Note that the 'Read Tag' function 305(23) is shown in Table 1 under the "Fig. 3 Level" heading 335, "Radio Communication Control", at sub-level 33. Steps 905 and 910 of the present example are indicated by arrow 315 in the 'Reader Communication & Control' callout in FIG. 3B.

At step 915, the 'Read Tag' library function 305(23) calls Read Tag driver API 304(23) in driver API library layer 205, in framework layer 304/firmware stratum Level 335, sub-level 23. At step 920, Read Tag driver API 304(23) calls Read Tag driver 303(23) in driver layer 203, in framework layer 305/firmware stratum Level 335, sub-level 23. Steps 915 and 920 of the present example are indicated by arrow 313 in FIG. 3B.

At step 925, the Read Tag driver sends a Read Tag command to platform 210, as indicated by arrow 204. Finally, at step 930, the platform sends the Read Tag command to Tag 230, which reads information stored in the tag, and sends information back to the reader, as indicated by arrow 202 in FIG. 3B. Note that steps 910 through 925 in the present example are each performed by a module in the same firmware stratum level (i.e., Level 335, sub-level 23).

Certain changes may be made in the above methods and systems without departing from the scope of that which is described herein. It is to be noted that all matter contained in the above description or shown in the accompanying drawings is to be interpreted as illustrative and not in a limiting sense. For example, the methods shown in FIGS. 8 and 9 may include steps other than those shown therein, and the systems shown in FIGS. 2-7 may include different components than those shown in the drawings. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall there between.

What is claimed is:

1. A framework structure for controlling an RFID device including a platform comprising an RFID radio, the structure comprising:
   a layered framework including:
      a first layer, including at least one functional module comprising a device driver, communicatively coupled with the platform; and
      a second layer, including at least one functional module comprising an API, communicatively coupled with the first layer and with an application for controlling the RFID device; and
   a firmware stratum comprising a tiered plurality of the functional modules, wherein the stratum is integrated with the layered framework such that each tier of the stratum is layered to functionally correspond to one of the layers in the layered framework.

2. The structure of claim 1, wherein the framework is vertically layered, and a structure formed by the plurality of functional modules is essentially orthogonal to the vertically layered framework.

3. The structure of claim 1, wherein the layered framework includes a third layer, communicatively coupled with the second layer, comprising code for the application.

4. The structure of claim 3, wherein each tier of the firmware stratum respectively includes an extensible set of modular software components selected from the group of component types consisting of drivers, libraries, and applications.

5. The structure of claim 1, wherein code in each of the first and second layers comprises modules such that each of the modules may be selectively encrypted to control access thereto.

6. The structure of claim 1, wherein the modularity of the structure provides a mechanism for an application to determine computing requirements of the structure as a function of the application.

7. The structure of claim 1, wherein, in response to a call from the application to the API, the API calls a corresponding device driver, which, in response thereto, communicates with the platform to control the RFID device.

8. A framework structure for controlling an RFID device including a platform comprising an RFID radio, the structure comprising:
   a layered framework including:
      a first layer, including functional modules comprising a device driver and a corresponding device driver API, communicatively coupled with the platform; and
      a second layer, including functional modules comprising a library module and a corresponding library API, communicatively coupled with the first layer and with an application for controlling the REID device; and
   a firmware stratum comprising a tiered plurality of the functional modules, wherein the stratum is integrated with the layered framework such that each tier of the stratum is layered to functionally correspond to one of the layers in the layered framework.

9. The structure of claim 8, wherein the framework is vertically layered, and a structure formed by the plurality of functional modules is essentially orthogonal to the vertically layered framework.

10. The structure of claim 8, wherein the layered framework includes a third layer, communicatively coupled with the second layer, comprising code for the application.

11. The structure of claim 10, wherein each tier of the firmware stratum respectively includes an extensible set of modular software components selected from the group of component types consisting of drivers, libraries, and applications.

12. The structure of claim 8, wherein code in each of the first and second layers comprises modules such that each of the modules may be selectively encrypted to control access thereto.

13. The structure of claim 8, wherein the modularity of the structure provides a mechanism for an application to determine computing requirements of the structure as a function of the application.

14. The structure of claim 8, wherein the first and second layers comprise firmware.

15. The structure of claim 8, wherein, in response to a call from the application to the library API, the library API calls a corresponding library module, in response to which the library module calls the corresponding device driver API, which, in response, calls the corresponding device driver, which, in response, communicates with the platform to control the RFID device.

16. A firmware system framework structure for an RFID device including a platform comprising an RFID radio, the structure comprising:
   a layered framework including:
      a first layer, including functional modules comprising driver-related code, communicatively coupled with the platform; and
      a second layer, including functional modules comprising API-related code, communicatively coupled with the first layer and with an application for controlling the reader;
      wherein the first layer includes a driver and a corresponding driver API for communicating therewith;

wherein the second layer includes a library function for communicating with the driver API, and a corresponding library function API providing communication between the application and the library function; and a firmware stratum comprising a tiered plurality of the functional modules, wherein the stratum is integrated with the layered framework such that each tier of the stratum is layered to functionally correspond to one of the layers in the layered framework.

17. The structure of claim 16, wherein each tier of the firmware stratum respectively includes an extensible set of modular software components selected from the group of component types consisting of drivers, libraries, and applications.

18. The structure of claim 16, wherein the framework is vertically layered, and a structure formed by the plurality of functional modules is essentially orthogonal to the vertically layered framework.

19. The structure of claim 16, wherein, in response to a call from the application to the library function API, the library function API calls a corresponding library function, in response to which the corresponding library function calls the driver API corresponding thereto, which, in response, calls the corresponding driver, which, in response, communicates with the platform to control the RFID device.

20. The structure of claim 16, wherein, in response to a call from the application to the library function API, the library function API calls a corresponding library function, in response to which the corresponding library function calls the driver API , which, in response, calls the corresponding driver, which, in response thereto, communicates with the platform to control the RFID device.

21. The structure of claim 16, wherein the layered framework includes a third layer, communicatively coupled with the second layer, comprising code for the application.

22. The structure of claim 16, wherein the code in each of the first and second layers comprises modules such that each of the modules may be selectively encrypted to control access thereto.

23. The structure of claim 16, wherein the modularity of the structure provides a mechanism for an application to determine computing requirements of the structure as a function of the application.

24. An operating system framework structure for an RFID reader including a platform comprising an RFID radio, the structure comprising:
a layered framework including:
a first layer, including driver-related code, communicatively coupled with the platform;
a second layer, including API-related code, communicatively coupled with the first layer and with an application for controlling the reader; and
a firmware stratum comprising a tiered plurality of functional modules integrated with the layered framework such that each tier of the firmware stratum is layered to functionally correspond to one of the layers in the layered framework.

25. The structure of claim 24, wherein:
the first layer includes a driver and a corresponding driver API for communicating therewith;

the second layer includes a function for communicating with the driver API, and a corresponding function API providing communication between the application and the function; and the first layer and the second layer include the functional modules in the firmware stratum.

26. The structure of claim 25, wherein, in response to a call from the application to the function API, the function API calls a corresponding function, in response to which the function calls the driver API corresponding thereto, which, in response, calls the corresponding driver, which, in response, communicates with the platform to control the RFID device.

27. A software system framework structure for an RFID reader including a platform comprising an RFID radio, the structure comprising:
a vertically layered framework including:
a first layer, including driver-related code, communicatively coupled with the platform;
a second layer, including API-related code, communicatively coupled with the first layer and with an application for controlling the reader;
a third layer including the application;
wherein the first layer includes device drivers and corresponding driver APIs for communicating therewith;
wherein the second layer includes library functional modules for communicating with the driver API, and corresponding library function APIs providing communication between the application and one of the library functional modules;
wherein the first layer, the second layer, and the third layer constitute a horizontally layered firmware stratum comprising a tiered plurality of functional modules including the library function APIs, the library functional modules, the driver APIs, and the device drivers, in which the stratum is integrated with the layered framework such that each tier of the firmware stratum is layered to functionally correspond to one of the layers in the layered framework.

28. The structure of claim 27, wherein one of the library function APIs, in response to a call from the application, calls a corresponding one of the library functional modules, which in response, calls a corresponding one of the driver APIs, which, in response, calls a corresponding one of the drivers, which, in response, communicates with the platform to control the RFID device.

29. The structure of claim 28, wherein each tier of the firmware stratum respectively includes an extensible set of modular software components selected from the group of component types consisting of drivers, libraries, and applications.

30. The structure of claim 28, wherein the firmware stratum structure formed by the plurality of functional modules is essentially orthogonal to the vertically layered framework.

31. The structure of claim 27, wherein the code in each of the first and second layers comprises modules such that each of the modules may be selectively encrypted to control access thereto.

32. The structure of claim 27, wherein the modularity of the structure provides a mechanism for an application to determine computing requirements of the structure as a function of the application.

* * * * *